United States Patent Office 3,040,156
Patented June 19, 1962

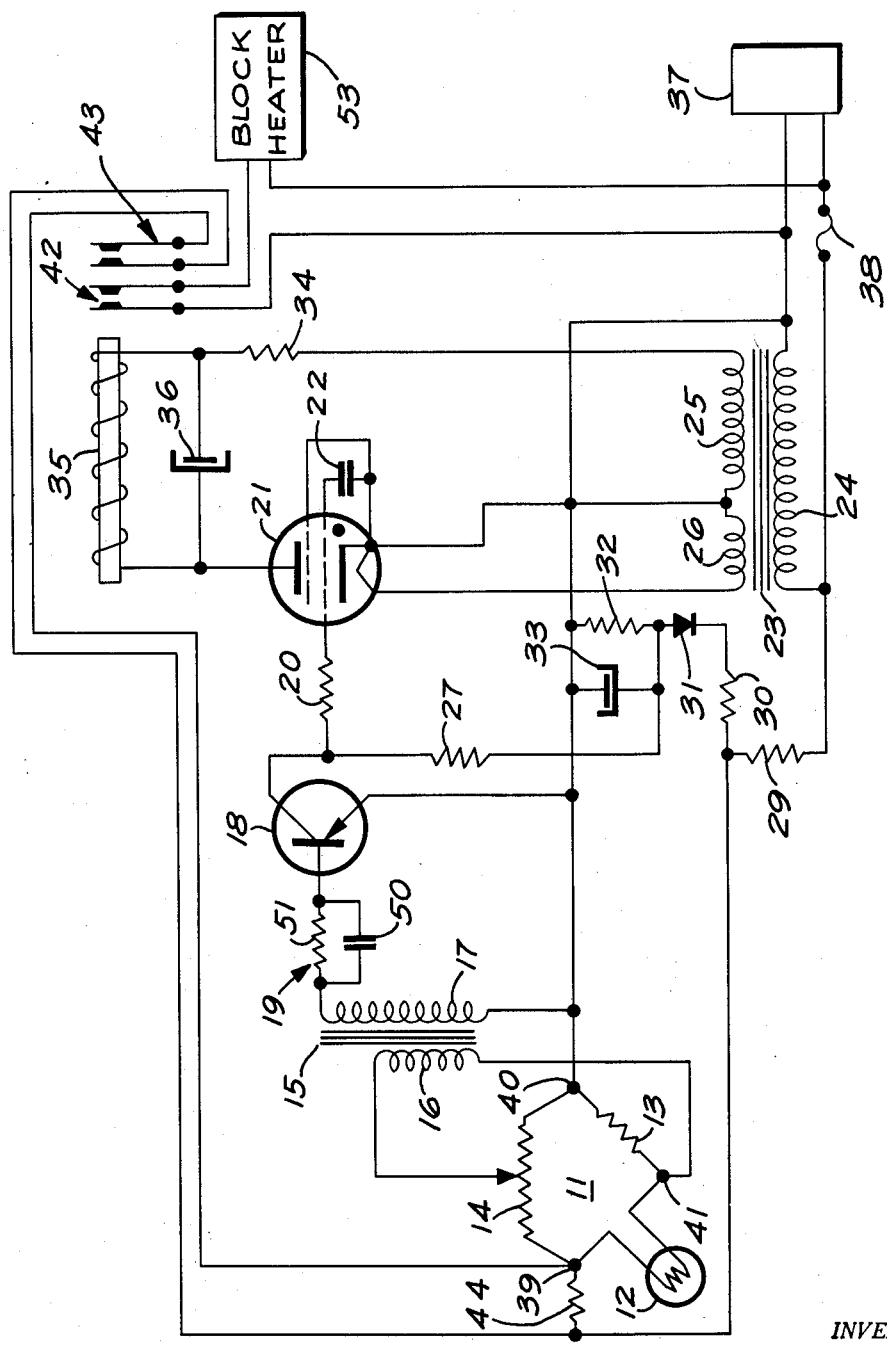

3,040,156
CONTROL CIRCUIT
Thomas W. McGlaughlin, Pensacola, Fla., assignor, by mesne assignments, to Monsanto Chemical Company, a corporation of Delaware
Filed Aug. 14, 1959, Ser. No. 833,780
4 Claims. (Cl. 219—20)

This invention relates to control circuits and more particularly to circuits for controlling the operation of a heater to maintain a predetermined temperature.

The process of hot drawing of nylon yarn requires an accurate control of the temperature of the yarn. In this process the yarn is drawn over a block which must be maintained at the desired drawing temperature. One of the disadvantages of equipment used in the past for heating the block has been that the temperature of the block could not be maintained within close limits. Consequently, one of the objects of the present invention is to provide an improved system for maintaining the block within a fraction of a degree of the desired temperature.

Another object of this invention is to provide a system for controlling a heater to maintain a predetermined temperature.

A further object of this invention is to provide a system having a temperature sensing bridge adapted to control a heater to maintain a predetermined temperature.

A still further object of this invention is to provide a heater control system having a temperature sensing bridge which is operated at one electrical potential when the heater is on and at another potential when the heater is off.

Still another object of this invention is to provide a system having a heater control bridge utilizing a thermistor which is operated at a normal electrical potential when the heater is off and at an elevated potential when the heater is on.

According to the system of the present invention, a temperature sensitive element senses the temperature of a block across which a nylon yarn is drawn. An output signal derived from a bridge in which the temperature sensitive element is connected is amplified and used to control a relay which in turn controls a heater supplying heat to the block. When the temperature drops a fraction of a degree below the desired temperature, the system will cause the heater to be turned on and, when the temperature of the block rises to a fraction of a degree above the desired temperature, the system will cause the heater to be turned off.

The circuit of the invention employs a thermistor to sense the temperature of the block. The thermistor is connected in a bridge circuit across which A.C. power is applied. An A.C. output signal is derived from the bridge. This A.C. signal is stepped up by a transformer, amplified by a transistor amplifier and then applied to the control grid of a thyratron tube. The thyratron tube has an A.C. voltage applied to its cathode and plate. The A.C. signal derived from the bridge circuit will have one phase, relative to the A.C. voltage, when the temperature is below a selected control point and will have the opposite phase when the temperature is above the control point. When the temperature is at the control point, the signal will be null. When the amplified signal applied to the grid of the thyratron is in phase with the voltage applied to the plate and cathode of the thyratron, the thyratron will fire. When the signal applied to the control grid of the thyratron is of the opposite phase from the voltage applied to the plate and cathode, the thyratron will not fire. The thyratron controls the relay, which in turn controls the heater supplying heat to the block.

The relay also controls the voltage applied to the bridge, by closing contacts to shunt a resistor connected in series with the bridge when the heater is on. This raises the voltage applied to the bridge, and to the thermistor. The circuit components are such that the increased voltage applied to the thermistor when the resistor is shunted will cause appreciable self-heating in the thermistor, whereas a normal amount of self-heating occurs when the resistor is in the circuit. The heat applied to the thermistor by the heater adds to the heat generated in the thermistor by the current resulting from the increased voltage to vary the temperature of the thermistor at a faster-than-normal rate. This causes the heater to be turned off sooner than otherwise, thereby increasing the cycling rate of the heater for maintaining a more accurate temperature control.

In order for the circuit to operate properly, the amplified signal applied to the control grid of the thyratron must be applied in precise alignment with the signal applied between the plate and cathode. If the signal applied to the grid is lagging or leading the signal applied between the plate and cathode, the thyratron will not fire in the desired manner. A phase shifting network is provided in the input of the amplifier to provide a precise alignment of the phase relationship of the amplified signal and the A.C. thyratron plate voltage.

Further objects and advantages of the invention will become apparent as the following description of a preferred embodiment of the invention is read in conjunction with the single FIGURE of the drawing, which is a schematic diagram showing the circuit of the invention.

In the drawing the reference number 12 designates the thermistor which senses the temperature of a block (not shown) across which a nylon yarn is drawn. An output signal derived from a bridge 11, in which the thermistor 12 is connected, is amplified and used to control a relay 35. Relay contacts 42 closed by the relay 35 turn a heater 53 off and on in response to the temperature of the block rising and falling past the desired temperature, the heater 53 supplying heat to the block. Contacts 43, closed by the relay 35, shunt a resistor 44 to raise the voltage applied to the thermistor and to thereby effect appreciable self-heating in the thermistor 12. A small amount of self-heating occurs in the thermistor 12 when the resistor 44 is in the circuit, this being a characteristic of a thermistor operated at the voltage for which it is designed. The heater 53, controlled by the bridge 11, supplies heat to the block to maintain temperature of the block precisely within a fraction of a degree of the desired temperature. This insures that the nylon yarn is at a proper drawing temperature.

As shown in the drawing, the thermistor 12 connected between terminals 39 and 41 forms one leg of the bridge 11. A resistor 13 connected between a terminal 40 and the terminal 41 forms a second leg of the bridge. The third and fourth legs of the bridge are formed by a potentiometer 14 connected between the terminals 39 and 40. The terminals 39 and 40 form two diagonal input points of the bridge, while the terminal 41 and the movable tap of the potentiometer 14 form two diagonal output points of the bridge. A 60 cycle A.C. voltage obtained from a source 37 is applied across the terminals 39 and 40, these being the bridge input terminals. This voltage is applied through a fuse 38, a resistor 29, and the resistor 44. The resistor 29, together with the resistor 44 and the bridge 11, operates as a voltage divider to provide a normal voltage across the terminals 39 and 40 when the resistor 44 is in the circuit. When the contacts 43 are closed to shunt the resistor 44, the voltage across the terminals 39 and 40 will be increased to a value sufficient to cause appreciable self-heating in the thermistor 12.

The increase in the bridge input voltage, resulting from the shunting of the resistor 44, increases the current flow through the bridge. This increased current flow is sufficiently high to cause self-heating in the thermistor 12. This self-heating lowers the resistance of the thermistor 12, as does heat applied to the block by the heater 53.

With this arrangement, a temperature responsive A.C. output signal will be generated between the terminal 41 and the movable tap of the potentiometer 14, these being the output terminals of the bridge 11. At a given setting of the movable tap, a null signal will be produced between the terminal 41 and the movable tap for a certain temperature, which shall be referred to as the control point or control temperature. If the block temperature rises above this control point, an output signal of one phase will be generated between the terminal 41 and the movable tap and, if the temperature is below this control point, a signal of the opposite phase will be generated between the terminal 41 and the movable tap. The control point or temperature can be varied up or down simply by adjusting the movable tap of the potentiometer 14.

The output signal of the bridge 11, generated between the movable tap of the potentiometer 14 and the terminal 41, is applied across a primary winding 16 of a step-up transformer 15. The signal induced in a secondary winding 17 of the transformer 15 is applied between the base and emitter of a PNP transistor 18. This induced signal from the secondary winding 17 is applied through a phase shifting network 19 connected in series with the base of the transistor 18 and comprising a capacitor 50 connected in parallel with a resistor 51.

The transistor 18 is connected and utilized as an amplifier. A D.C. voltage is applied between the collector and emitter of the transistor 18 from a charged capacitor 33 through a load resistor 27. The capacitor 33 is shunted by a resistor 32 and is charged from the supply at the source 37 through the resistor 29, a resistor 30 and a rectifier 31. The signal induced in the secondary winding 17 of the transformer 15 will thus be amplified by the transistor 18. The amplified output signal is generated at the collector of the transistor 18 and is applied to the control grid of a thyratron tube 21 through a resistor 20.

A.C. power is applied to the plate and cathode of the thyratron tube 21 from a secondary winding 25 of a transformer 23 having a primary winding 24 and an additional secondary winding 26 connected to the winding 25. The supply voltage at the source 37 is applied across the primary winding 24 of the transformer 23 through a fuse 38. The winding 25 is designed to generate a 115 volt, 60 cycle output, and the winding 26 is designed to generate a 6.3 volt, 60 cycle output for operating the heater of the thyratron. The junction between the windings 25 and 26 is connected to the cathode of the thyratron 21, while the other end of the secondary winding 25 is connected to the plate of the thyratron 21 through a resistor 34 and the winding of the relay 35. These connections provide the A.C. voltage between the plate and cathode of the thyratron 21. The winding of the relay 35 is shunted by a capacitor 36, and a capacitor 22 connects the control grid of the thyratron to the cathode of the thyratron.

The terminal 40, one end of the secondary winding 17 of the transformer 15, the emitter of the transistor 18, one side of the capacitor 33, the common junction of the secondary windings 25 and 26 of the transformer 23, one end of the primary winding 24 of the transformer 23, and one side of the power supply at the source 37 are all connected together to provide a common reference point for the entire circuit.

When the amplified output signal from the transistor 18 applied to the control grid of the thyratron tube 21 is in phase with the A.C. voltage applied between the plate and cathode of the thyratron 21, the thyratron will then fire on every positive half cycle of the A.C. voltage. When the thyratron 21 fires, current will flow through the winding of the relay 35, thus energizing it and closing the relay contacts 42 and 43. The thyratron 21 will stop conducting on each negative half cycle since the plate voltage will be negative. However, the relay 35 will remain energized because the capacitor 36 will charge up during each positive half cycle and maintain the current through the winding of relay 35 during each negative half cycle of the A.C. voltage.

The energized relay 35 will hold the contacts 43 closed to shunt the resistor 44, thereby causing a higher voltage to be applied to the bridge. This, in turn, causes appreciable self-heating in the thermistor 12. This increased amount of self-heating, added to the heating effect of the heater 53, rapidly decreases the resistance of the thermistor 12. Since the operation of the relay 35 depends upon the resistance of the thermistor 12, it can be seen that this rapid decrease in the resistance of the thermistor will cause the heater 53 to be shut off after a shorter time duration than would be the case if the normal amount of self-heating occurred in the thermistor. The result is that the heating cycle is shortened by the increased self-heating of the thermistor, with a greater number of heating cycles taking place in a given time period. Heating is thus more uniform and the temperature of the block is maintained within very narrow limits.

As soon as the amplified voltage applied to the control grid of the thyratron 21 drops to zero or reverses its phase, the thyratron will stop firing and current will stop flowing through the winding of the relay 35, which accordingly will be deenergized. When the amplified voltage applied to the control grid of the thyratron 21 is of the opposite phase from the voltage across the cathode and plate, the thyratron will not fire because, when the voltage applied to the plate is positive, the voltage applied to the grid will be negative. It will now be apparent why the signal applied to the control grid of the thyratron must be precisely aligned with the voltage applied to the thyratron. If this precise alignment is not present, when the signal applied to the grid of the thyratron 21 is supposed to be of the opposite phase from the voltage across the plate and cathode, a part of the signal applied to the grid will be positive when the plate voltage of the thyratron 21 is positive and the thyratron will fire when it is not supposed to.

The function of the phase shifting network 19 is to provide a small phase shift so that the amplified signal applied to the control grid of the thyratron 21 is precisely aligned with the signal applied across the plate and cathode. If the circuit is built on a bread board, it turns out that no phase shifting circuit such as network 19 is necessary but, when the circuit is placed in a casing, the network 19 is necessary, probably due to stray reactance.

The circuit gives a much higher sensitivity than any circuit of the prior art with a corresponding number of components. The circuit can distinguish between a slight change in the resistance of the thermistor 12 or in the setting of the tap of the potentiometer 14. The exact reason why this extraordinary sensitivity is obtained is not known, but it is believed that the superior result is obtained because of the waveshape output from the transistor 18. The waveshape output is not the same as the input because the transistor is operated partially outside of its linear range. This effect is achieved by using a step-up transformer to supply an increased input to the transistor amplifier, instead of a step down transformer, which would normally suggest itself to be used.

The phase shifting network 19 may be substituted for by other means to perform the same function. For example, a phase shifting network may be connected between the emitter of the transistor 18 and the common connection providing the reference point for the circuit. However, the circuit is most sensitive if the phase shifting network is connected between the secondary winding 17 of the transformer 15 and the base of the transistor 18.

The above described system has been described for use as a temperature control in the process of hot drawing of nylon yarn. The system is, of course, applicable to many other control applications and particularly to other temperature control applications including those in which the control part is refrigerated instead of heated.

Many modifications may be made to the above described specific embodiment without departing from the spirit and scope of the invention, which is limited only as defined in the appended claims.

What is claimed is:

1. A heater control circuit, comprising a temperature sensing bridge having therein a resistance variable in response to temperature, a resistor connected in series with the bridge, a power supply connected across the resistor and the bridge for applying a predetermined input voltage thereto, an amplifier connected to the bridge for producing a signal of one phase when the bridge is unbalanced in one direction and a signal of the opposite phase when the bridge is unbalanced in the other direction, a thyratron connected to the amplifier for conduction in response to said signal of said one phase, an electrically actuated heater, a relay connected to the thyratron for connecting the heater to the power supply when the thyratron conducts, and a circuit connected across the resistor and closeable by the relay for shunting said resistor simultaneously with connecting the heater to the power supply to increase the input voltage to the bridge when the heater is on.

2. A heater control circuit, comprising a heater, a temperature sensing bridge having therein a thermistor, a resistance connected in series with the bridge, a power supply connected across the resistance and the bridge, an amplifier, a transformer having a primary winding connected across the bridge and a secondary winding connected to the amplifier for controlling the amplifier in response to signals from the bridge, a thyratron connected to the amplifier and to the power supply, a phase shifting network connected in the input of the amplifier for adjusting the phase of input signals from the amplifier relative to the phase of the power supply, and a relay connected in series with the thyratron and having a first pair of contacts connected in series with the heater and the power supply for applying power to the heater when the thyratron is conductive, said relay also having a second pair of contacts connected across the resistance and closeable simultaneously with the first pair of contacts for shunting the resistance when the heater is actuated to thereby increase the voltage applied to the bridge for causing self-heating in the thermistor during all of the period that the heater is actuated.

3. A heater control circuit, comprising a heater, a power supply, a temperature sensing bridge, a resistance connected in series with the bridge across the power supply, and a relay connected to the bridge in such a manner as to be energized when the temperature sensed by the bridge falls below a predetermined value, said relay having a first pair of contacts connected in series with the heater across the power supply, said relay having a second pair of contacts connected across the resistance and closeable simultaneously with the first pair of contacts for shunting the resistance simultaneously with connection of the heater to the power supply.

4. A heater control circuit, comprising a heater, a power supply, a temperature sensing bridge, a resistance connected to the bridge input, said resistance and said bridge being connected in series across the power supply, a relay having a first pair of contacts connected in series with the heater across the power supply, said relay having a second pair of contacts connected across the resistance and closeable simultaneously with the first pair of contacts for shunting the resistance simultaneously with connection of the heater to the power supply, and means connected to and operated by the bridge for energizing the relay when the sensed temperature varies in a predetermined direction from a predetermined value.

References Cited in the file of this patent

UNITED STATES PATENTS

| | | |
|---|---|---|
| 2,057,902 | Moreau | Oct. 20, 1936 |
| 2,475,309 | Chalberg | July 5, 1949 |
| 2,479,319 | Crowley et al. | Aug. 16, 1949 |
| 2,518,108 | York et al. | Aug. 8, 1950 |
| 2,680,215 | Mershon et al. | June 1, 1954 |
| 2,808,496 | Van Gorcum | Oct. 1, 1957 |
| 2,825,789 | Scott | Mar. 4, 1958 |
| 2,866,067 | Dolan et al. | Dec. 23, 1958 |
| 2,958,008 | Bray et al. | Oct. 25, 1960 |